United States Patent [19]

Krogh

[11] Patent Number: 4,765,786
[45] Date of Patent: Aug. 23, 1988

[54] DRILL GUIDE

[76] Inventor: Kris K. Krogh, 6822 Trigo Rd., Goleta, Calif. 93117

[21] Appl. No.: 58,334

[22] Filed: May 28, 1987

[51] Int. Cl.$^4$ .............................................. B23B 45/14
[52] U.S. Cl. .................................. 408/110; 408/115 R
[58] Field of Search ....................... 408/72, 75, 88, 95, 408/99, 100, 110, 111, 112, 115, 712, 241 G

[56] References Cited

U.S. PATENT DOCUMENTS

| | | | |
|---|---|---|---|
| D. 280,796 | 10/1985 | Somers | D8/61 |
| 2,788,684 | 4/1957 | Scharf | 408/72 |
| 2,997,900 | 8/1961 | Pugsley | 408/95 |
| 3,107,556 | 10/1963 | Pugsley | 408/110 |
| 3,381,551 | 5/1968 | Lavering et al. | 408/72 |
| 3,661,469 | 5/1972 | Leff et al. | 408/72 |
| 3,838,935 | 10/1974 | Boyajian | 408/100 |
| 3,853,420 | 12/1974 | Abell | 408/99 |
| 3,874,810 | 4/1975 | Russell | 408/14 |
| 3,890,058 | 6/1975 | Self et al. | 408/712 |
| 4,082,474 | 4/1978 | Stiger | 408/110 |
| 4,253,784 | 3/1981 | Anderson | 408/72 |
| 4,314,782 | 2/1982 | Beekenkamp | 408/16 |
| 4,375,341 | 3/1983 | Schulze | 408/72 R |

Primary Examiner—Neil Abrams

[57] ABSTRACT

A guide accessory for hand-held electric drills having straight sides. A drill is set up for use simply by inserting it into the guide, where it fits snugly and slides linearly. An enlarged foot section holds the guide perpendicular to the work surface. The foot is abbreviated on one side, permitting the guide to be used close to obstacles. An adjustable stop facilitates drilling holes to precise depths. The stop assembly is also used to tilt the guide for drilling holes at various indicated angles. A stepped "v" block at the bottom of the guide facilitates drilling centered holes in round stock, corners, and the edges of boards. A resilient, transparent material is used in construction to permit viewing the drilling process while protecting the user's eyes. Holes are provided for ventilating the drill and for hanging the guide on a workshop pegboard.

15 Claims, 4 Drawing Sheets

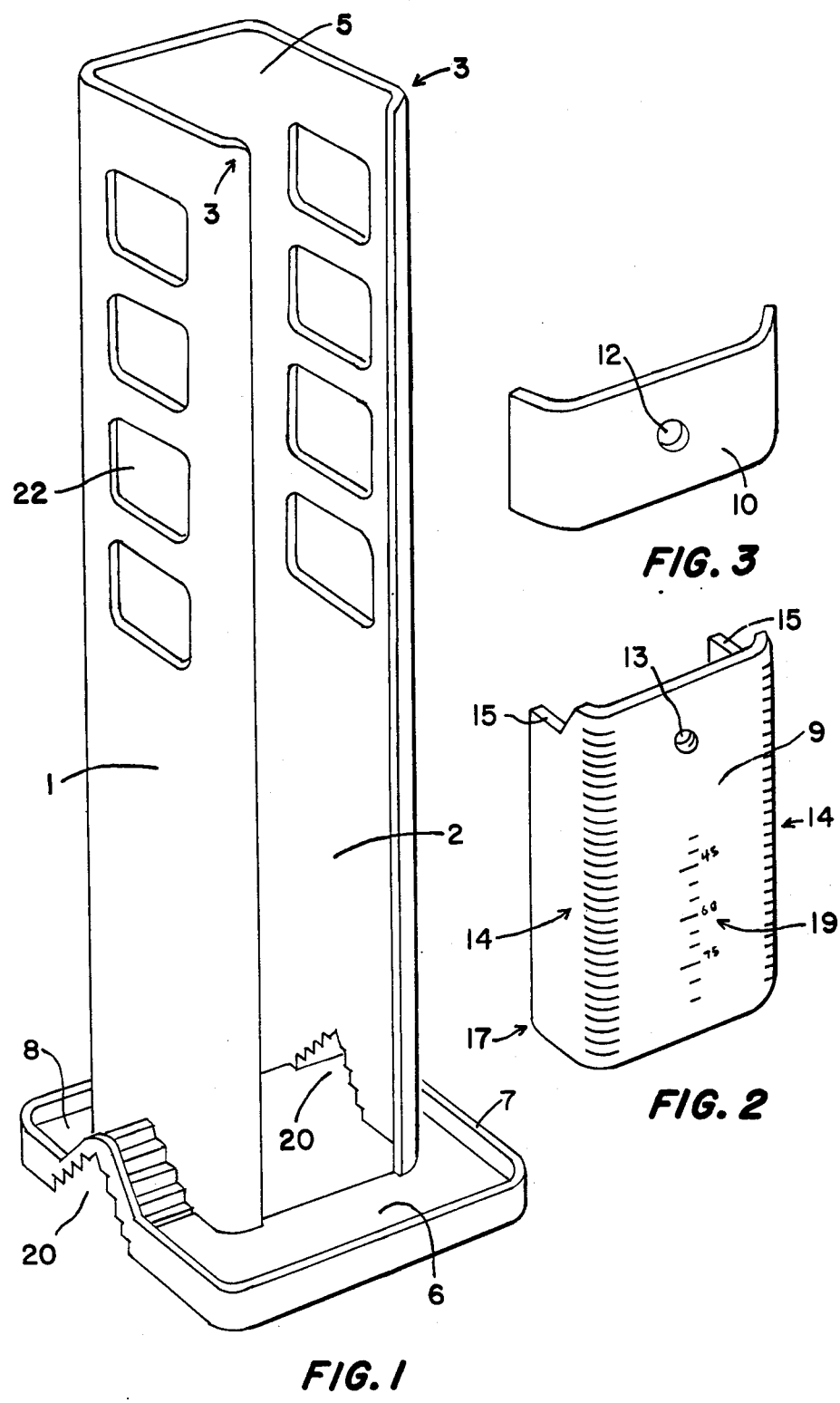

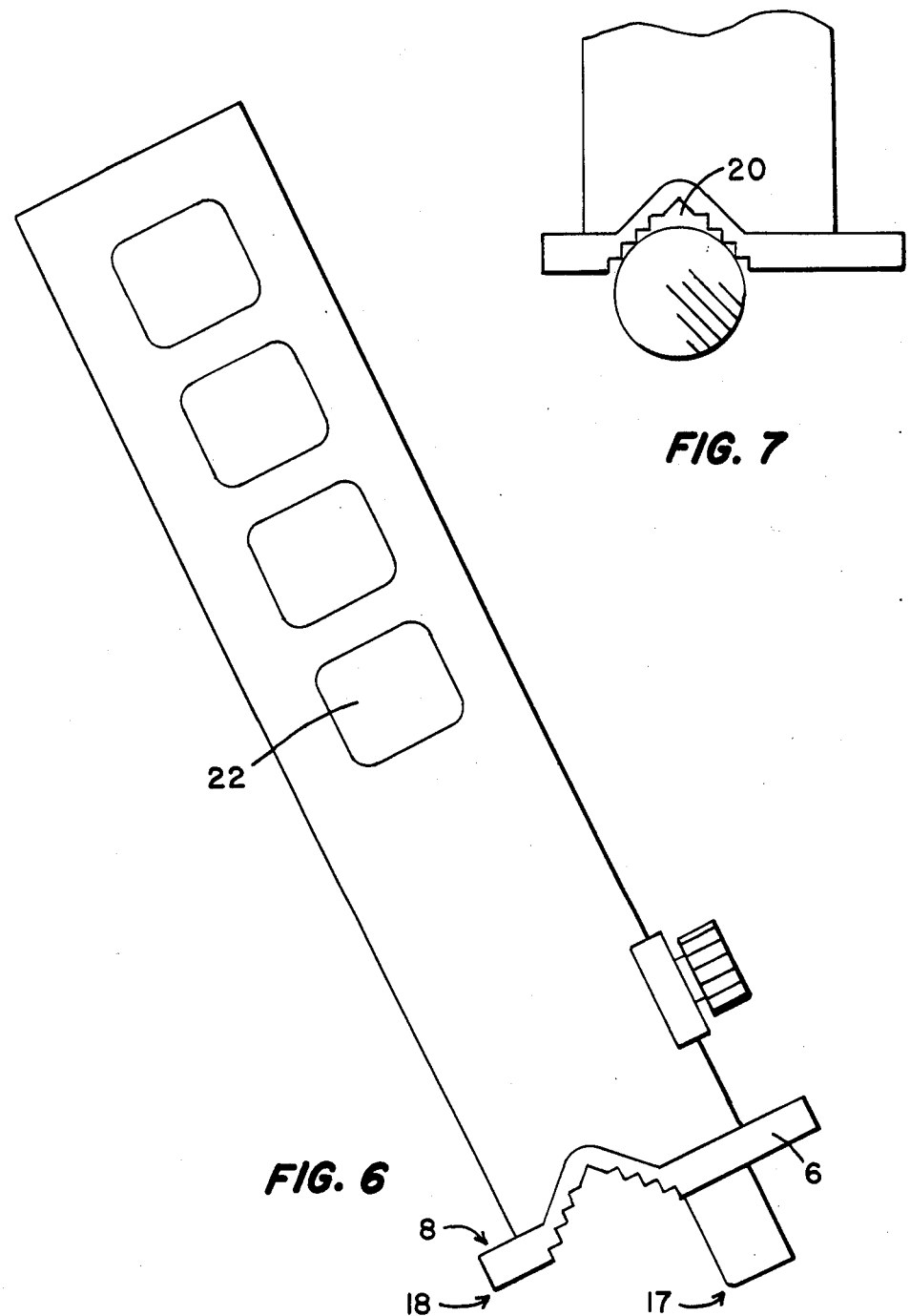

DRILL GUIDE

BACKGROUND OF THE INVENTION

1. Field of the Invention

The present invention pertains to guide devices for hand-held electric drills.

2. Description of the Prior Art

The patent literature shows a wide variety of devices for guiding hand-held electric drills. One common type of guide device acts by constraining the drill bit itself. Guides of this type are disclosed in U.S. Pat. Nos. 2,788,684 to Scharf, 3,381,551 to Lavering et al., 3,661,469 to Leff et al., and 4,253,784 to Anderson. Many of the guides of this type employ bushings to hold the bit. Such guides can only be used with drill bits that fit the bushings provided. Another drawback is that extra-long bits are often called for, since they must be long enough to pass through the bushing and still drill a sufficiently deep hole.

Another common type of drill guide is that in which the drill is affixed to a moveable stage or rod whose motions are guided. Examples of this type of guide are U.S. Pat. Nos. 2,997,900 to Pugsley, 3,838,935 to Boyajian, 3,853,420 to Abell, 3,890,058 to Self et al., 3,874,810 to Russell, 4,082,474 to Stiger, 4,314,782 to Beekencamp and 4,375,341 to Schulze. Many of the guides in this category offer a variety of features. However, affixing the drill to the stage can be a difficult and time consuming process.

Two popularly used guides from this group are U.S. Pat. Nos. 3,874,810 to Russell and 4,375,341 to Schulze. These devices offer a number of useful features and also have simple designs which can be manufactured economically. To use either of these devices, the chuck is removed from the drill and screwed onto one end of the device, while the body of the drill is screwed onto the other. However, chuck removal can be a difficult process. To loosen a standard drill chuck, the chuck key is inserted and banged sharply with a mallet or piece of wood. The user must be aware that the chuck has a reverse thread. With reversing drills, it is also necessary to remove a reverse-threaded screw inside the chuck. Also, not infrequently, chucks become jammed and refuse to loosen. Once the guided holes have been made it may then be necessary to remove the drill from the guide and reassemble it. Consequently, the use of these guides may not be worthwhile when only a small number of guided holes are to be drilled.

U.S. Pat. No. 3,107,556 to Pugsley discloses a guide which has a number of useful features and does not require that the drill be affixed to a moving stage. With this device, a specially designed cylindrical drill is set up simply by inserting it into a tubular guide. The drill is then guided by a sliding action. However, this design has limitations also.

Unlike an ordinary drill, where the grip projects from the side, the Pugsley drill has a "saw-type" handle attached to the end, where it will not interfere with the guide tube. The cylindrical drill housing also appears bulkier than that of an ordinary drill, to the extent that a user probably could not wrap his or her hand around it. These factors would make the drill difficult to handle when drilling holes without the guide.

The guide of Pugsley is apparently constructed of an opaque material, providing "a window (opening) through which the tip of the drill bit may be visually observed". This type of construction would interfere with the illumination of the work piece and would only permit viewing from a certain angle. This arrangement also fails to provide eye protection, since there is no protective transparent material directly between the viewer's eye and the drill bit.

The Pugsley guide includes two retractable legs which may be extended to tilt the guide for drilling angled holes. While this is a useful feature, it would be preferable if only a single member required adjustment for drilling angles. The patent also notes that longer bits may be required for drilling angled holes.

Another limitation is that, to compensate for wear, shimming may be required "to insure a relatively close fit of the drill and guiding member".

Still another limitation of Pugsley is its size and complexity, which would tend to increase its manufacturing cost relative to other drill guides.

The above limitations are overcome in the present invention.

SUMMARY OF THE INVENTION

An object of the present invention is to provide a versatile drill guide which is ready for immediate usage, without special set-up procedures. A further object is that it provide features for drilling holes to precise depths and at precise angles. A still further object is that it provide for drilling centered holes through round stock, corners, and the edges of boards. Another object is that it provide eye protection for users. Still another object is that it be easy to store and inexpensive to manufacture.

The present invention is designed for use with drills having straight sides, such as that disclosed in U.S. Pat. No. D280,796 to Somers. A drill is set up for use simply by inserting it into the guide. A large slot in the side of the guide accommodates the drill's handle. The guide is made of a resilient material and the sides must flex outward slightly as the drill is inserted. This applies pressure to the sides of the drill, holding it in the center of the guide and constraining its motion to a linear sliding action. Unlike the guide disclosed in U.S. Pat. No. 3,107,556 to Pugsley, no shimming is required to maintain a close fit.

An enlarged foot section holds the drill perpendicular to work pieces for drilling 90 degree holes. The foot is abbreviated on one side to permit the guide to be used in tight spots, such as in drilling next to walls. Keeping this side of the foot short also facilitates tilting the guide for drilling angled holes, as described below.

A depth stop is provided for drilling holes of precise depths. A portion of the depth stop rides inside the main body of the guide and blocks the downward movement of the drill when set to an appropriate position. When tightened in place, raised teeth on the depth stop mate with teeth on the main body, preventing slippage.

The depth stop assembly also functions as an adjustment for drilling angled holes. This is done by extending the depth stop out through the bottom of the device and locking it in place. This tilts the guide, which then rests on the short side of the foot and on the depth stop. The settings for drilling various angles are indicated on the stop. Angles from 90 down to less than 40 degrees can be drilled. Unlike the guide of U.S. Pat. No. 3,107,556 to Pugsley, longer bits are not required for drilling angled holes.

A pair of stepped v-shaped notches at the bottom of the guide provide automatic centering for a variety of materials. The overall v-shape permits the notches to function as a "v" block for drilling centered holes in pipe, round stock and corners. The steps in the notches are dimensioned to precisely engage the edges of boards of standard thicknesses, such as ½, ¾, and 1 inch materials for drilling centered holes.

A transparent resilient material, such as polycarbonate plastic, is used in both the main body and the depth stop. This permits the work piece to be seen clearly from all sides, while protecting the hands and eyes of the user from flying cuttings and broken drill bits.

The guide has vent holes in the side which coincide with the drill's vents to permit cooling. The guide also has a hole at the top, in back, for hanging the device on a hook or the like. Unlike most drill guides, the present invention can be hung easily on a workshop pegboard.

The main body of the guide consists of a single molded piece. In all, there are only four components: the main body, depth stop, brace, and tightening knob. Consequently, the device is inexpensive to manufacture.

Additional features and advantages of the present invention will become apparent below.

BRIEF DESCRIPTION OF THE DRAWINGS

FIG. 1 is a perspective view of the main body of the present invention.

FIG. 2 is a perspective view of the inner component of the depth stop assembly.

FIG. 3 is a perspective view of the outer brace component of the depth stop assembly.

FIG. 6 is a side view of the present invention showing the depth stop assembly being used to tilt the guide.

FIG. 7 is a side view of the lower portion of the present invention showing the automatic centering of round stock.

DESCRIPTION OF THE PREFERRED EMBODIMENTS

Figures 4, 5:
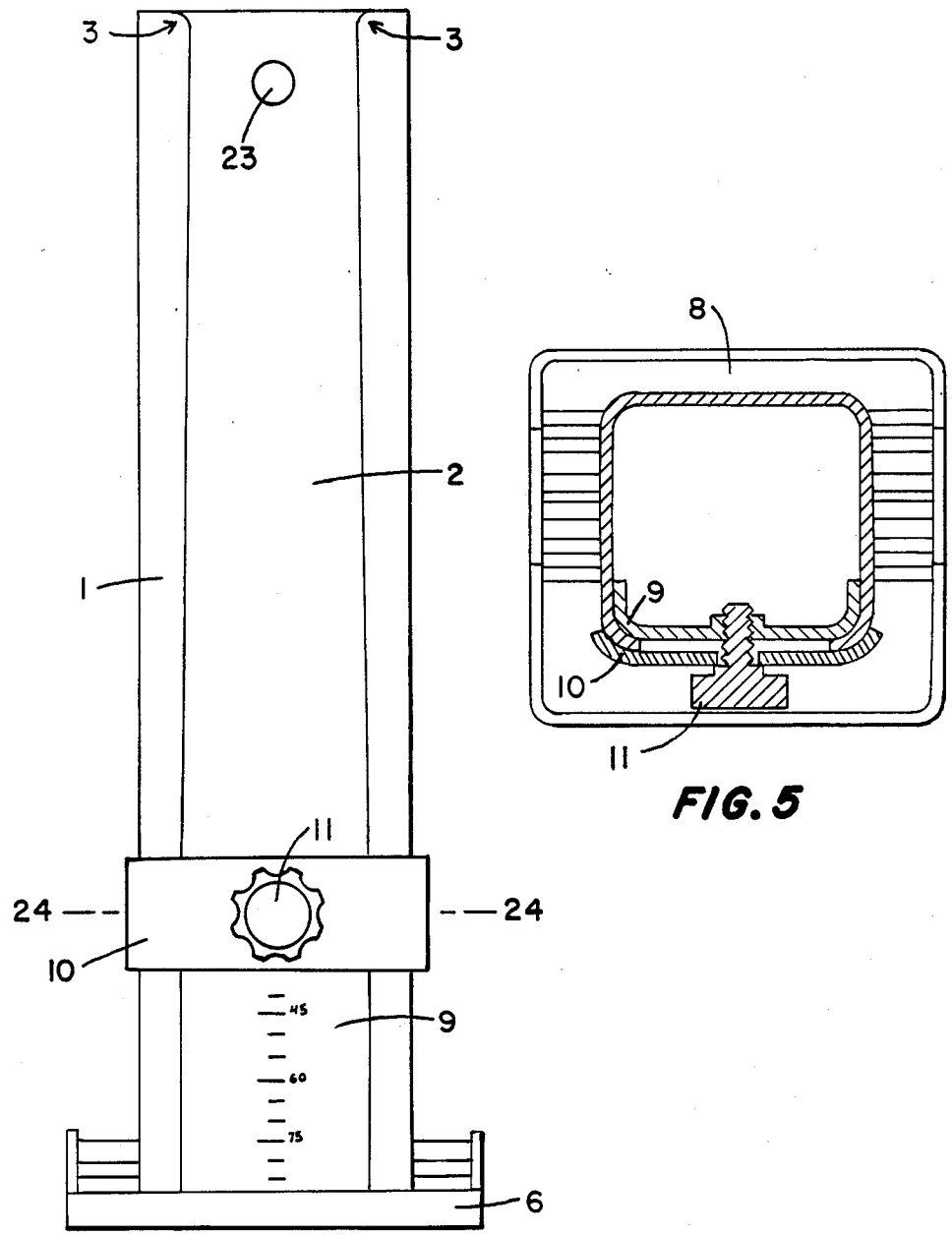
FIG. 4 is a front view of the present invention.
FIG. 5 is a horizontal cross-sectional view taken along lines 24—24 of FIG. 4.

The embodiment shown in the figures was configured for use with a particular type of electric drill, the M47 Series made by Black and Decker, Inc. This type of drill is shown in U.S. Pat. No. D280,796 to Somers. The body for these drills has straight sides which run parallel to the axis of the chuck. The body shape is utilized to advantage in the present invention.

The main body of the present invention is shown in FIG. 1. Preferably, it consists of a single molded piece made of a transparent, resilient material such as polycarbonate plastic. The main body includes a hollow, elongated member 1 which accommodates the drill's body. The hollow member 1 has substantially straight sides and a large slot 2 running parallel to the axis of the member. In usage, the drill is simply inserted through the opening 5 at the top into the hollow member 1, where it fits snugly. The slot 2 accommodates the drill's handle. Once inside the guide, the drill is constrained to a linear sliding motion parallel to the axis of the member 1.

Prior to insertion of the drill, the sides of the hollow member 1 deviate slightly from a parallel condition, with the upper corners, 3 bent in slightly toward the center of the slot 2. Consequently, the end opening 5 is slightly smaller than the body of the drill. When the drill is inserted into the guide, the sides of the hollow member 1 flex outward slightly to accomodate it. The resilient sides of the member then apply pressure to the sides of the drill, holding it in the center and eliminating any sideways play of the drill.

A foot section 6 attached to the lower end of the member provides a work engaging surface which orients the guide perpendiculary when contacting a work piece. The foot extends outward perpendicularly from the base of the hollow member 1 for increased stability and accuracy in drilling 90 degree holes. A rib 7 has been added to the periphery of the foot to increase its strength and rigidity. The foot section is kept short on one side 8, to permit the guide to be used in close proximity to obstacles such as walls.

A depth stop assembly is provided for drilling holes to precise depths. The depth stop consists of three components: an inner component 9, shown in FIG. 2, brace 10 shown in FIG. 3, and tightening means 11, shown in FIGS. 4 and 5. Preferably, the inner component 9 consists of a resilient, transparent material such as polycabonate plastic. As shown in FIG. 5, the tightening means consists of a knob with a threaded shaft which passes through a hole 12 in the brace (shown in FIG. 3) and mates with a threaded hole 13 (shown in FIG. 2) in the inner component. Alternatively, a screw could be projected outward from the inner component, mating with a threaded hole in the knob.

As shown in FIGS. 4 and 5, the inner component 9 of the depth stop rides inside the hollow member 1, along the same slot 2 which accommodates the drill's handle. The brace 10 rides across the outside of the slot. Before it is tightened in place, the depth stop assembly is free to be moved along the slot. When the knob 11 is manually twisted, the inner component 9 is pulled outward against the inner surface of the hollow member, holding it in place. FIG. 2 shows raised teeth 14 on the inner component which mate with teeth on the interior surface of the hollow member 1 to prevent slippage when the depth stop is tightened in place.

When set to a low position, the depth stop assembly does not interfere with movement of the drill. By raising and tightening the depth stop, it can be set to block the movement of the drill at a selected point, setting a limit on the depth of holes to be drilled. The drill is blocked when it contacts surfaces 15 (shown in FIG. 2) on the upper end of the inner component.

The depth stop is a dual purpose assembly. It also serves to tilt the guide for drilling holes of specified angles. This is done by extending the assembly out through the bottom of the guide and locking it in place, as shown in FIG. 6. The guide then rests on the lower corners 17 of the depth stop and on the rear edge 18 of the foot 6. The short rear portion 8 of the foot permits an increased amount of tilting.

Shown in FIG. 2, indicia 19 are provided on the inner component 9 of the depth stop assembly to specify the angle of tilt. To set the guide to a particular angle, the mark corresponding to the desired angle is aligned with the upper, front surface of the foot 6. Alternatively, similar indicia could be provided on the hollow member which would align with a mark or edge on the depth stop assembly.

Figure 8:
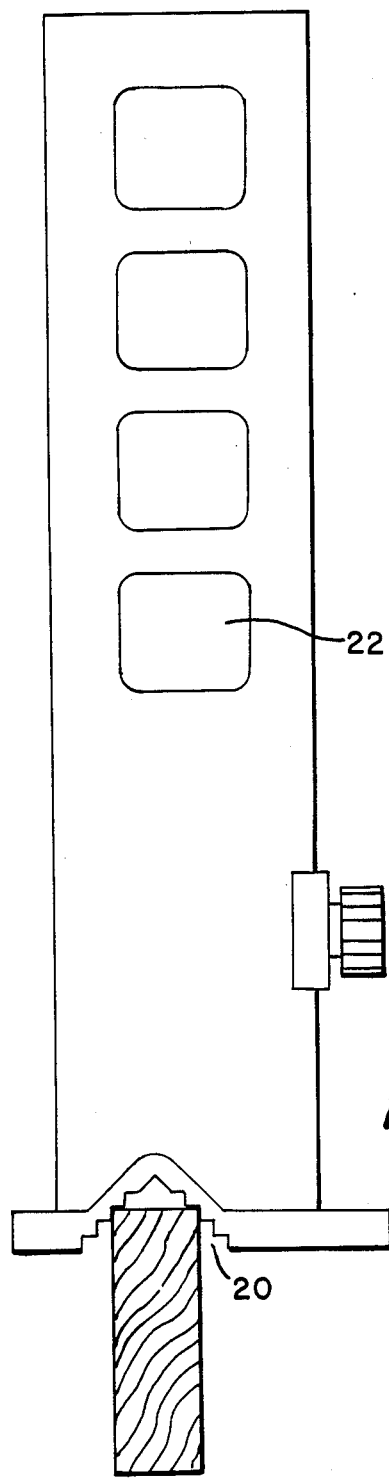
FIG. 8 is a side view of the present invention showing the automatic centering of a board edge.

Shown in FIG. 1, a pair of stepped v-shaped notches 20 at the bottom of the guide provide automatic centering for a variety of materials. In FIG. 7, the notches are shown pressed against a piece of round stock, holding it in a centered position for drilling. This "v" block function can also be used to drill centered holes in pipe, in the apex of a 90 degree corner, and in other materials. The steps in the notches 20 are dimensioned to precisely engage the edges of boards of standard thicknesses, such as ½, ¾, and 1 inch materials. FIG. 8 shows a board edge held in a centered position for drilling.

Because a transparent, resilient material is used in construction of both the main body and the inner component of the depth stop, the work piece is easily illuminated and can be seen from all sides. At the same time, significant eye protection is afforded from flying drill cuttings and broken drill bits. When the depth stop is in a lowered position, the drill bit is enclosed on all sides. When the guide is tilted for drilling angled holes, the depth stop extends out over the bit to help provide protection in this case also.

The hollow member has holes 22 in the sides which coincide with the drill's vents to permit cooling of the motor. As shown in FIG. 4, an additional hole 23 is provided at the top, in back, for hanging the device on a hook or peg.

Although preferred embodiments of the present invention have been described for illustrative purposes, many changes could be made in its structure and use. For example, separate adjustments for angle and depth could be provided, as in U.S. Pat. No. 3,107,556 to Pugsley. Very importantly, similar guides could be constructed for other drills, besides that shown in U.S. Pat. No. D280,796 to Somers. Various drills having straight sides with a variety of cross-sectional shapes could be used. The present invention should not be considered limited by these particular embodiments, but rather by the spirit and scope of the claims below.

What is claimed is:

1. A guide for hand-held electric drills, where
(a) a suitable drill has a side mounted handle and substantially straight sides disposed parallel to the axis of the drill's chuck,
(b) the guide has a hollow channel-shaped member with substantially straight sides and a slot disposed parallel to the axis of the member,
(c) the hollow channel-shaped member receives and conforms closely, in areas, to the body of said drill, such that the drill is constrained to a linear sliding motion, parallel to the axis of the member, with the slot accommodating the drill's handle, and
(d) the guide has a work engaging end disposed perpendicular to the axis of the hollow member, permitting accurate perpendicular holes to be drilled in a work piece contacting said end.

2. A drill guide according to claim 1, including a foot section which extends outward perpendicularly from the work engaging end of the hollow member for added stability and accuracy in drilling perpendicular holes.

3. A drill guide according to claim 2, where the foot section is abbreviated on one side to permit the guide's usage in close proximity to obstacles, such as walls.

4. A drill guide according to claim 1, where the sides of the hollow member include a resilient, transparent material, permitting the work piece to be illuminated through and seen through the sides of the hollow member, while helping to protect a user's eyes from drilling debris.

5. A drill guide according to claim 1, including an adjustable depth stop assembly having a portion which resides inside the hollow member and which may be set to block the downward motion of the drill at various positions.

6. A drill guide according to claim 5, where the depth stop includes a brace which rides on the outside of the hollow member and a tightening means which serves to pull the depth stop against the surface of the hollow member to hold it in position.

7. A drill guide according to claim 6, where the inner portion of the depth stop and the interior surface of the hollow member have mating teeth which help hold the depth stop assembly in place when it is tightened in position.

8. A drill guide according to claim 1, having an adjustable member which may be extended downward from the bottom of the guide and then locked in position, making contact with the work surface and tilting the guide to facilitate drilling precisely angled holes.

9. A drill guide according to claim 8, where the adjustable member is marked to indicate the correct positions for drilling at particular angles.

10. A drill guide according to claim 6, where the depth stop may also be extended out through the bottom of the guide and then locked in position, making contact with the work surface and tilting the guide to facilitate drilling precisely angled holes.

11. A drill guide according to claim 1, where the work engaging end includes a pair of substantially v-shaped notches which serve to hold round stock and other materials in the proper position for drilling centered holes.

12. A drill guide according to claim 11, where the v-shaped notches are stepped to engage the edges of boards of various sizes, holding them in the proper position for drilling centered holes.

13. A drill guide according to claim 1, where the hollow member includes holes which coincide with vents on the drill to facilitate cooling the drill motor.

14. A drill guide according to claim 1, where the hollow member includes a hole at the top for hanging the device on a hook.

15. A drill guide according claim 1, where the sides of the hollow member consist of a resilient material, are bent inward slightly prior to insertion of the drill, are flexed outward by the insertion of the drill, and subsequently exert a centering pressure on the sides of the drill.

* * * * *